US011606997B2

(12) United States Patent
Teetzel et al.

(10) Patent No.: US 11,606,997 B2
(45) Date of Patent: *Mar. 21, 2023

(54) MODULAR HELMET INTERFACE WITH THREADED INSERT

(71) Applicant: Wilcox Industries Corp., Newington, NH (US)

(72) Inventors: James W. Teetzel, Portsmouth, NH (US); Gary M. Lemire, Lee, NH (US)

(73) Assignee: Wilcox Industries Corp., Newington, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/155,328

(22) Filed: Oct. 9, 2018

(65) Prior Publication Data

US 2019/0107247 A1   Apr. 11, 2019

Related U.S. Application Data

(60) Provisional application No. 62/568,934, filed on Oct. 6, 2017, provisional application No. 62/570,592, filed on Oct. 10, 2017.

(51) Int. Cl.
*A42B 3/04* (2006.01)
*A42B 3/06* (2006.01)
*F16M 13/02* (2006.01)
*F16B 47/00* (2006.01)

(52) U.S. Cl.
CPC ............ *A42B 3/0406* (2013.01); *A42B 3/063* (2013.01); *F16B 47/003* (2013.01); *F16M 13/02* (2013.01)

(58) Field of Classification Search
CPC ....... A42B 3/04; A42B 3/0406; A42B 3/0413; A42B 3/042; A42B 3/044; A42B 3/30; A42B 3/063; G02B 23/125; F21V 21/084; F16B 37/122; F16B 47/003; A47G 1/17; A47G 1/175; F16M 13/02
USPC .......... 2/6.1, 6.2, 422; 224/181; 248/222.14, 248/224.7, 314
See application file for complete search history.

(56) References Cited

U.S. PATENT DOCUMENTS

| | | | |
|---|---|---|---|
| 1,658,573 A | 2/1928 | Roper et al. | |
| 5,600,870 A * | 2/1997 | Fields | E05D 11/105 403/93 |
| 5,913,480 A * | 6/1999 | Luhmann | A47G 1/175 24/304 |
| 6,457,838 B1 * | 10/2002 | Dugmore | F21L 15/14 362/106 |
| 6,718,559 B1 * | 4/2004 | Davidson | G09F 21/02 24/324 |
| 6,751,810 B1 * | 6/2004 | Prendergast | A42B 3/04 403/321 |

(Continued)

*Primary Examiner* — Jonathan Liu
*Assistant Examiner* — Guang H Guan
(74) *Attorney, Agent, or Firm* — McLane Middleton, Professional Association

(57) ABSTRACT

A helmet mount system for attaching a device to a helmet comprises a threaded interface assembly having an outer portion and a threaded insert received within a cavity formed in the outer portion. The outer portion has an inward facing surface configured to receive an adhesive layer for coupling the inward facing surface to a surface of the helmet. In a further aspect, a ballistic helmet having the helmet mount system herein is provided, wherein the helmet mount system does not penetrate a ballistic layer of the ballistic shell.

10 Claims, 6 Drawing Sheets

(56) References Cited

U.S. PATENT DOCUMENTS

| | | | |
|---|---|---|---|
| 7,004,439 B1* | 2/2006 | Taylor | A42B 3/04 |
| | | | 248/548 |
| 7,524,153 B2* | 4/2009 | Hoy | F16B 37/122 |
| | | | 411/108 |
| 7,584,582 B1 | 9/2009 | Hutter, III | |
| 8,028,344 B2* | 10/2011 | Rogers | A42B 3/166 |
| | | | 2/6.2 |
| 8,689,409 B2 | 4/2014 | Hanley et al. | |
| 8,911,191 B2* | 12/2014 | James | F16B 37/041 |
| | | | 411/84 |
| 9,770,060 B2 | 9/2017 | Infusino et al. | |
| 9,872,531 B2* | 1/2018 | Uke | A42B 3/04 |
| 10,258,100 B1 | 4/2019 | Erb et al. | |
| 10,383,387 B2* | 8/2019 | Gendron | A42B 3/30 |
| 10,519,993 B2* | 12/2019 | Avalos Sartorio | F16B 5/02 |
| 10,939,718 B2* | 3/2021 | Teetzel | A42B 3/04 |
| 11,330,857 B2* | 5/2022 | Teetzel | A42B 3/04 |
| 2008/0000015 A1 | 1/2008 | Sutter et al. | |
| 2010/0012692 A1* | 1/2010 | Harris | A42B 3/04 |
| | | | 224/181 |
| 2014/0084118 A1 | 3/2014 | Tooley | |
| 2014/0223643 A1 | 8/2014 | Infusino et al. | |
| 2015/0040967 A1 | 2/2015 | West et al. | |
| 2015/0189939 A1* | 7/2015 | Roberts | A42B 3/04 |
| | | | 2/422 |
| 2015/0351482 A1* | 12/2015 | Gendron | A42B 3/04 |
| | | | 2/422 |
| 2016/0161222 A1 | 6/2016 | Lee | |
| 2018/0109006 A1 | 4/2018 | Ng et al. | |
| 2019/0098952 A1* | 4/2019 | Teetzel | A42B 3/04 |
| 2019/0104797 A1* | 4/2019 | Teetzel | A42B 3/0406 |
| 2019/0107247 A1* | 4/2019 | Teetzel | F16M 13/02 |

\* cited by examiner

MODULAR HELMET INTERFACE WITH THREADED INSERT

CROSS-REFERENCE TO RELATED APPLICATION

This application claims the priority benefit of U.S. provisional application Nos. 62/570,592 filed Oct. 10, 2017 and 62/568,934 filed Oct. 6, 2017. Each of the aforementioned provisional applications is incorporated herein by reference in its entirety.

BACKGROUND

The present disclosure relates to a modular interface for a helmet and, in particular, to a modular helmet mount system to accommodate the mounting of various accessory devices to a protective helmet such as a ballistic combat helmet or other protective helmet or headgear.

Prior art helmet mounting systems commonly rely on one more holes formed in the helmet for attaching a night vision mounting system. Exemplary hole patterns include single-hole patterns, such as the Standard One-Hole pattern, and multiple-hole patterns, such as the Standard Three-Hole pattern.

Ballistic helmets derive their ballistic protection from a shell formed of highly consolidated layers of polymer impregnated aramid fiber (e.g., Kevlar fabric impregnated with a polyvinyl butyral (PVB)-phenolic resin). When one or more holes are drilled in the shell, the ballistic integrity is compromised, both because of the voids such holes create in the ballistic structure, as well as because of the ability of moisture to infiltrate the composite material at the site of the hole and cause separation of the ballistic plies over time.

When holes are drilled in the ballistic shell, the ballistic integrity of the shell may be compromised. This can be mitigated somewhat when the holes are drilled by the manufacturer at the factory before the shells are sprayed with a sealant finish to insure the holes are sealed from moisture, which that will cause the ballistic fabric layers to separate over time and lose their ballistic protective properties. Nonetheless, even when properly sealed at the factory, the underlying ballistic structure of the helmet is weakened where the holes are drilled and must be mitigated by the use of ballistic grade mounting hardware, including, e.g., with ballistic grade threaded inserts bonded into the holes by the manufacturer and ballistic grade screws used for securing hardware to the helmet, the ballistic screws being threaded into the threaded inserts even when the mounting holes are not being used.

Sometimes it is desired to attach mounting hardware to a helmet that has been predrilled with a different hole pattern. In such cases, a user will drill new holes to accommodate the mounting hardware. Drilling new holes disrupts the sealant finish on the helmet, which may allow the ballistic fabric layers to separate due to moisture absorption, and weakens the composite structure of the helmet. When holes are drilled by the end user, there is also a risk that the holes may not be in the correct position on the helmet.

The present disclosure contemplates a new and improved helmet mounting interface and method which does not require holes to be drilled in the ballistic shell of the helmet.

SUMMARY

In one aspect, a helmet mount system for attaching a device to a helmet comprises a threaded interface assembly having an outer portion and a threaded insert received within a cavity formed in the outer portion. The outer portion has an inward facing surface configured to receive an adhesive layer for coupling the inward facing surface to a surface of the helmet.

In a more limited aspect, the inward facing surface is generally convex.

In another more limited aspect, the inward facing surface has an irregular surface.

In another more limited aspect, the inward facing surface has a plurality of channels formed therein for receiving an adhesive.

In another more limited aspect, wherein the threaded insert comprises a threaded sleeve and an enlarged diameter portion, and further wherein the cavity includes a bore receiving the threaded sleeve and a counterbore receiving the enlarged diameter portion.

In another more limited aspect, a cover is removably attached to removably attached to the threaded sleeve.

In another more limited aspect, the outer portion has an exterior facing surface opposite the inward facing surface, the exterior facing surface having one or more recesses configured to receive a complementary protrusions on an attached device.

In another more limited aspect, the outer portion is formed of a material selected from the group consisting of a metal, a polymer material, and a composite material.

In another aspect, a ballistic helmet comprises a ballistic shell and a helmet mount system for attaching a device to the ballistic helmet, the helmet mount system being adhesively attached to a surface of the helmet. The helmet mount system comprises a threaded interface assembly having an outer portion and a threaded insert received within a cavity formed in the outer portion. The outer portion has an inward facing surface adhesively bonded to a surface of the helmet, wherein the helmet mount system does not penetrate a ballistic layer of the ballistic shell.

One advantage of the present development is that it does not require holes to be drilled through the ballistic shell of the helmet, thereby maintaining ballistic integrity of the helmet.

Another advantage resides in adaptability for interchangeably attaching a variety of devices to be mounted, including without limitation, night vision devices, battery packs, illuminating devices, friend foe systems, rail-type accessory mounts including Picatinny, NATO Accessory Rail (NAR), Standardization Agreement (STANAG) 2324 rail, MIL-STD 1913 rail, and other rail-type mounts, to provide a modular helmet system.

Another advantage of the present helmet mounting interface system is that it is independent of the helmet material and the geometric shape and size of the helmet.

Still another advantage of the present system resides in its relatively low profile, which reduces the snag hazards associated with the mounting interface, and which snag hazard is further mitigated with removable covers.

Yet another advantage of the present development is that it is readily amenable to standardization, which enables it to define a common interface that multiple manufactures can design to, thereby further increasing the modularity of the system and the range of accessory options available. Just as the Picatinny weapon rail interface standard has greatly increased intercompatibility among weapon-mounted accessory devices, it is contemplated that the present development can be standardized to increase intercompatibility among helmet-mounted accessory devices.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
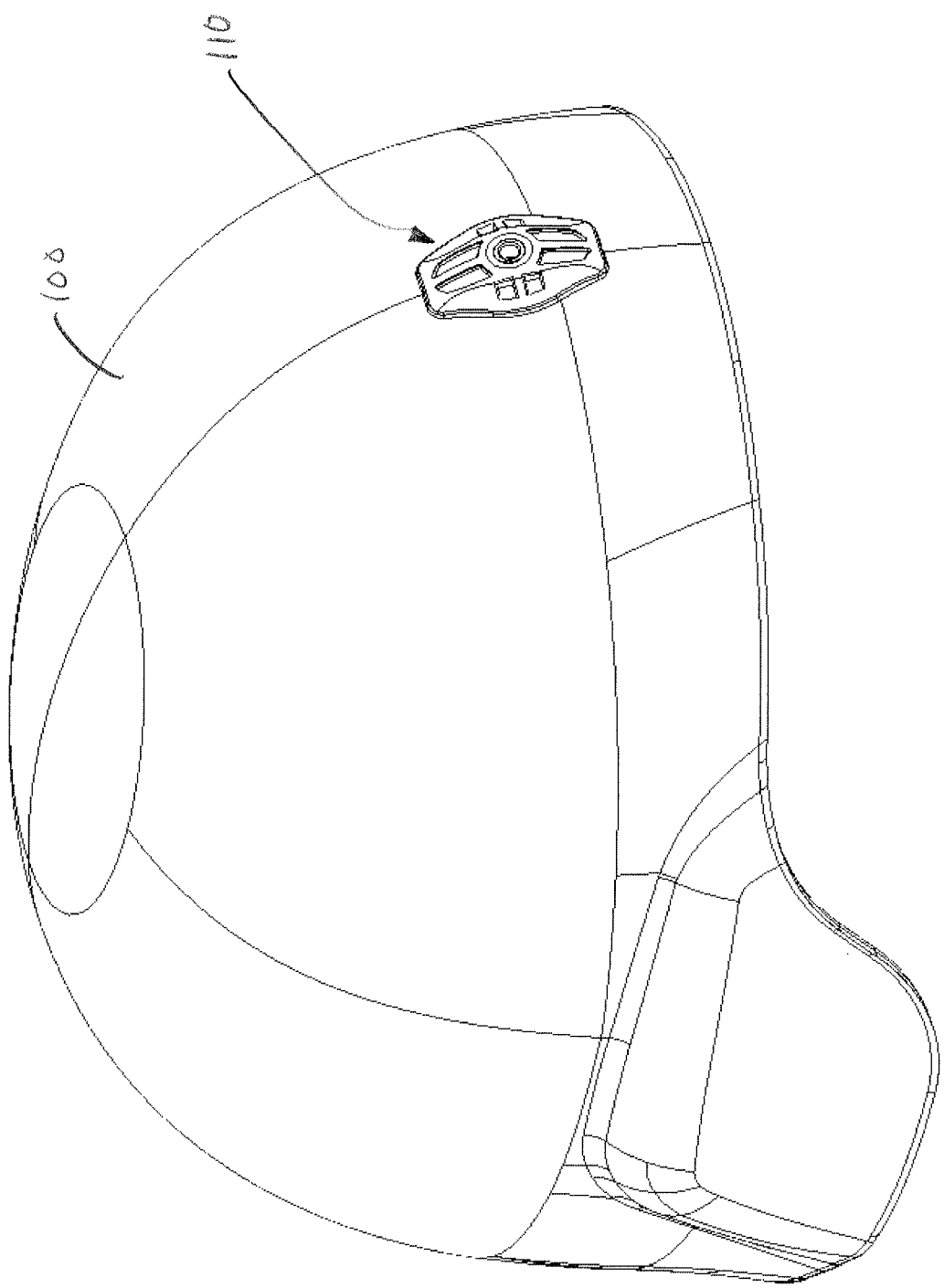
FIG. 1 is an isometric view of a helmet having a threaded interface assembly according to a first exemplary embodiment.

Referring now to the drawings, FIG. 1 is an isometric view of an exemplary helmet 100 showing one threaded interface assembly 110 in accordance with this disclosure attached to the front, central portion of the helmet. The threaded interface assembly 110 is permanently secured to the surface of the helmet 100 with an adhesive. In certain embodiments, the adhesive is selected from the group consisting of single-component, hear curable epoxy adhesives, two-component epoxy adhesives, structural acrylic adhesives, including acrylic and methyl methacrylate adhesives, and cyanoacrylate adhesives.

The threaded interface assembly 110 includes an outer portion 112 and a threaded insert 212 disposed within the outer portion 112. In certain embodiments, the outer portion 112 has an outward or exterior-facing surface 114 that is generally rounded or convex to avoid posing a snag hazard when the threaded interface assembly is not being used. In certain embodiments, the threaded interface assembly 110 has a generally concave bottom or helmet facing surface 116 which generally conforms to the curvature of the helmet surface and/or provides a space to hold a quantity of adhesive.

It will be recognized that the illustrated embodiment showing a threaded interface assembly herein at a front and center location is exemplary only. It will be recognized that any other number (e.g., 2, 3, 4, 5, 6, 7, 8, or more) of threaded interface assemblies 110 can be used and that the threaded interface assemblies can be adapted for positioning at any one or more locations on the helmet, including, for example, the rear, side(s), top, and elsewhere. In certain embodiments, a second threaded interface assembly (not shown) is attached to a rear, central portion of the helmet, e.g., for attaching a battery pack or a battery docking unit. In further embodiments one or more pairs of spaced apart threaded interface assemblies 110 can be provided, e.g., on the front of the helmet on opposite sides of the median plane of the helmet, on the front of the helmet along the median plane of the helmet, on the rear of the helmet on opposite sides of the median plane of the helmet, on the rear of the helmet along the median plane of the helmet, on the top of the helmet on opposite sides of the median plane of the helmet, on the top of the helmet along the median plane of the helmet, or any combination thereof.

In certain embodiments, the illustrated helmet 100 is a military combat helmet such as a ballistic fiber combat helmet (e.g., Advanced Combat Helmet (ACH)), although protective helmets formed of other materials such as thermoplastics, metals, etc., are also contemplated.

Although the present development will be shown by way of reference to threaded interface assemblies 110 attached to the exterior surface of the helmet 100, it is also contemplated that the threaded interface assemblies herein could also be attached to an interior surface of the helmet for attaching interior components of the helmet, such as cushions, suspension webbing, chin straps, nape straps, sweatbands, communications devices, and so forth.

Figure 2:
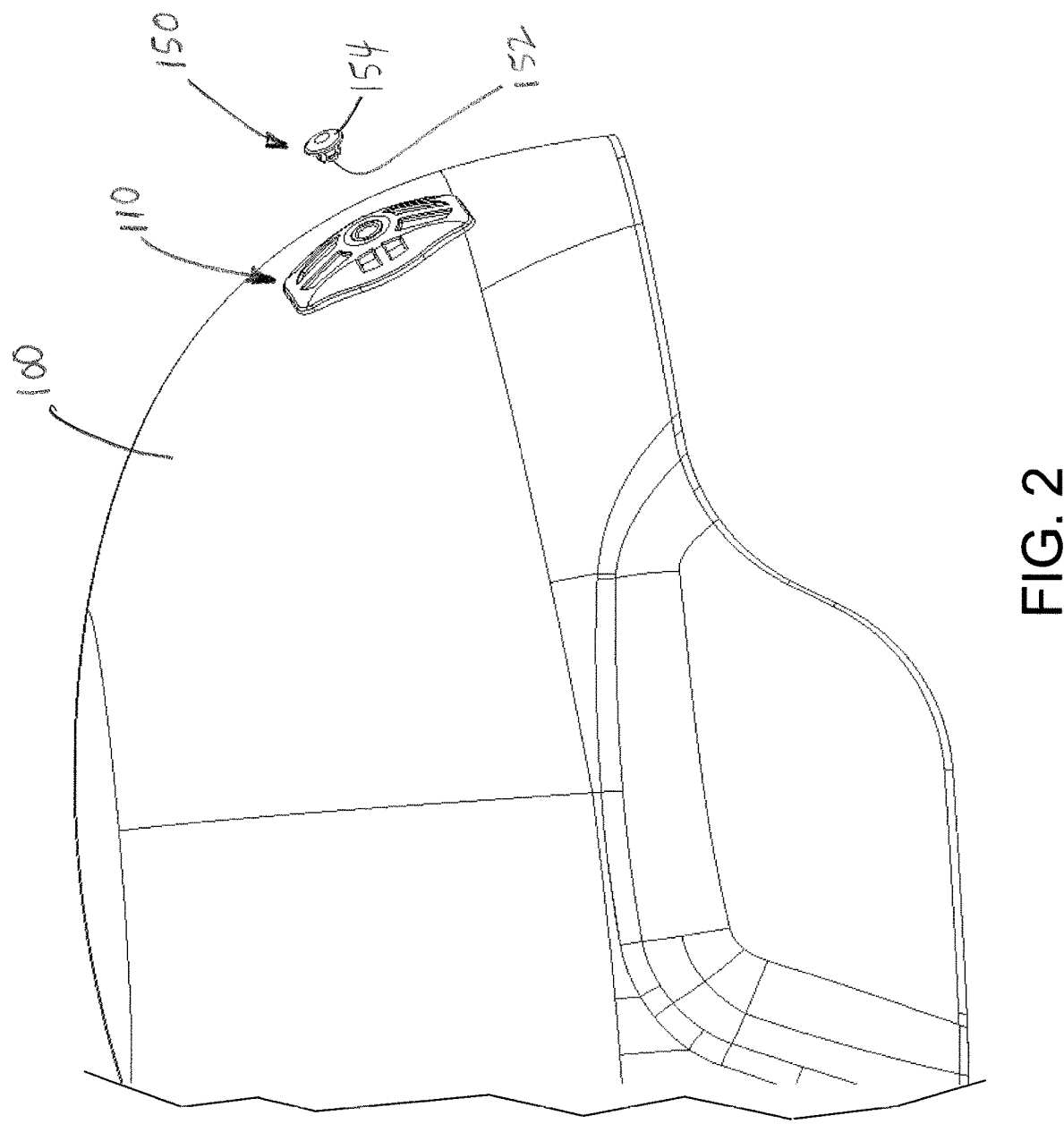
FIG. 2 is a fragmentary view of the embodiment appearing in FIG. 1, showing a removable cap for covering the threaded screw hole to reduce the likelihood of snagging when the threaded interface assembly is not in use.

FIG. 2 is a fragmentary view of the helmet 100 with threaded interface assembly 110 as shown in FIG. 1, and further including an optional cover or insert 150 provided to protect the threaded insert from snag hazards when the threaded interface assembly 110 is in use.

Figure 3:
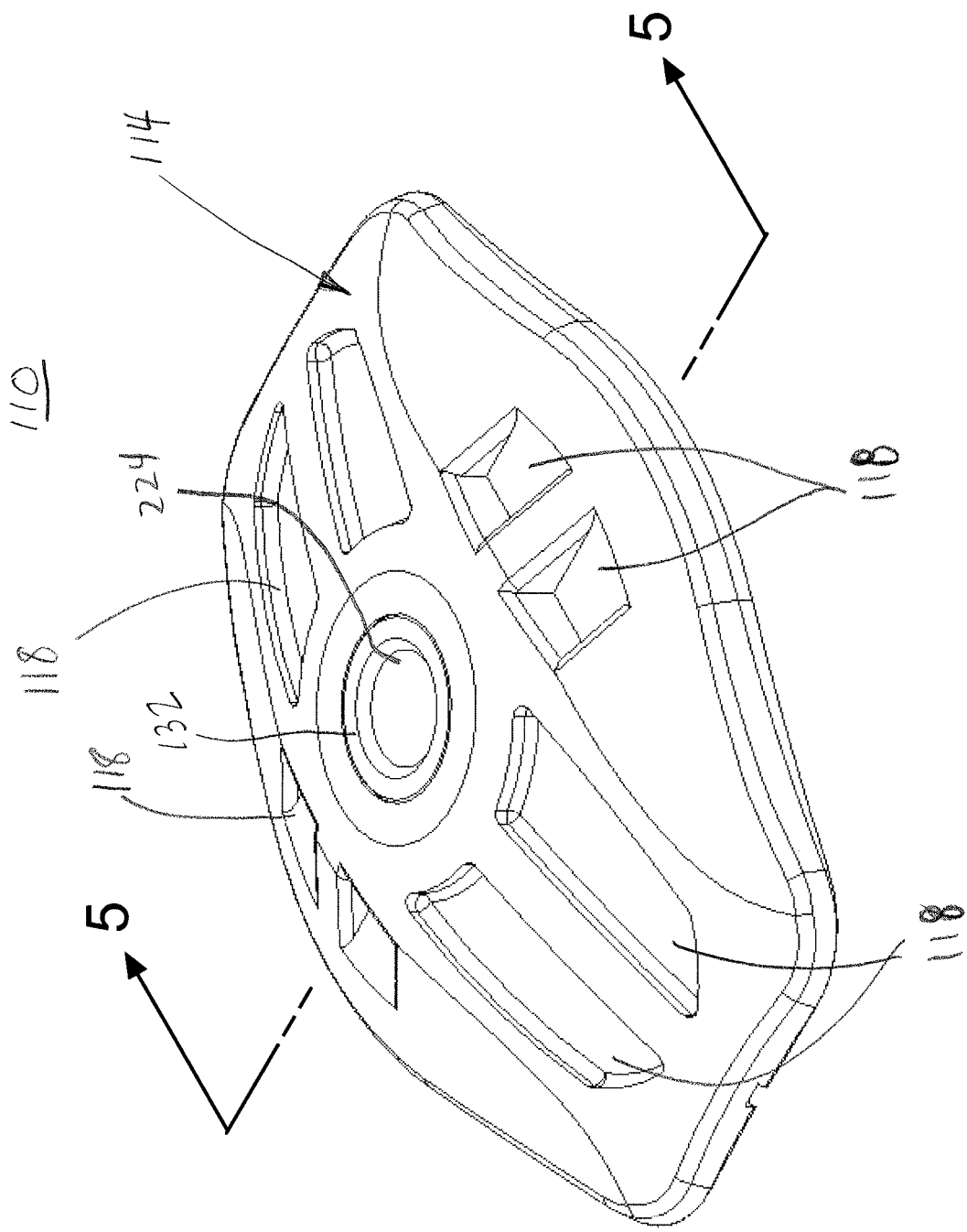
FIG. 3 is an enlarged isometric view of the threaded interface assembly, taken generally from the top and side.
Figure 4:
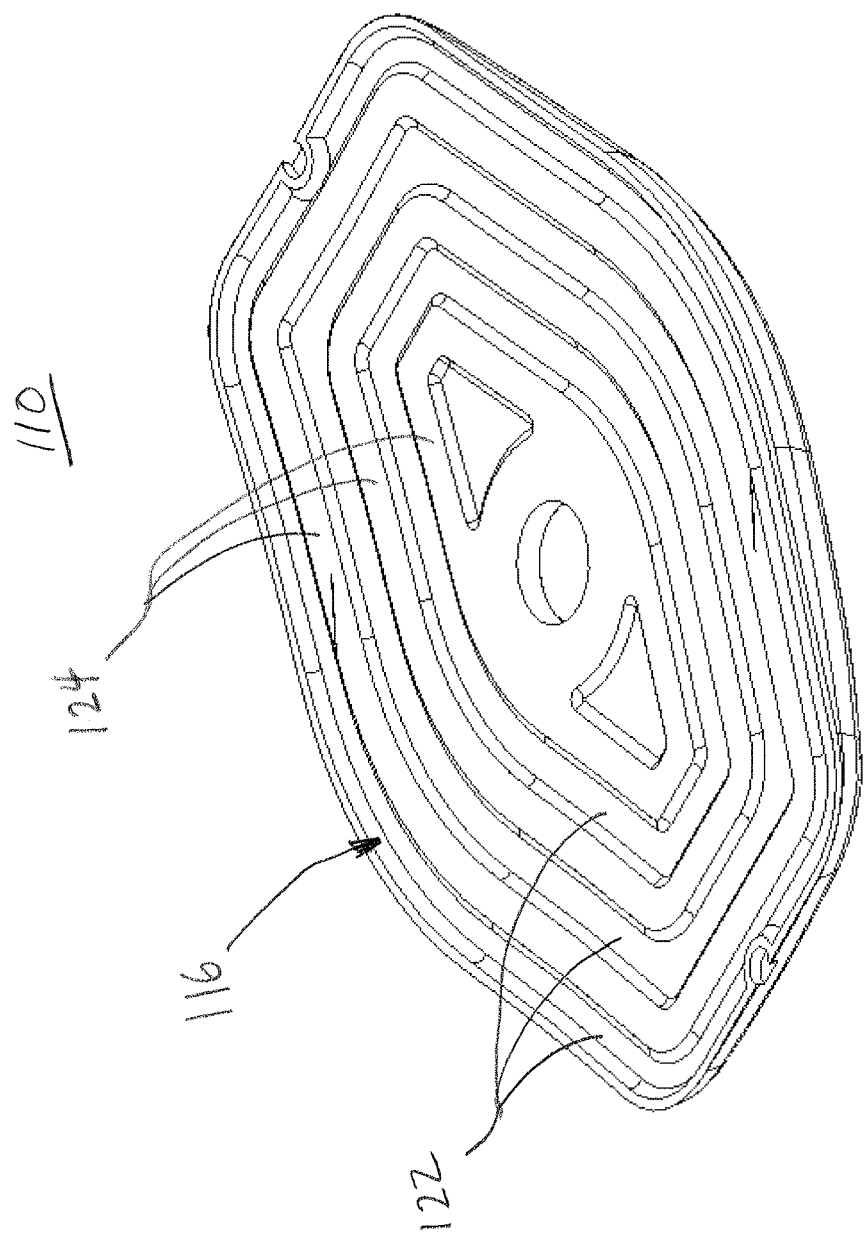
FIG. 4 is an enlarged isometric view of the threaded interface assembly, taken generally from the bottom and side.

FIGS. 3 and 4 are enlarged top and bottom views, respectively, of the threaded interface assembly 110. Although the exemplary threaded interface assemblies 110 are illustrated herein as having an elongated, convex, generally hexagonal peripheral shape, it will be recognized that the peripheral shape may be any desired shape, including circular, three-sided, four-sided (e.g., square), five-sided, regular hexagonal, or any other geometric shape.

As best seen in FIG. 3, in certain embodiments, the outer or exterior surface 114 of the threaded interface assembly 110 includes a plurality of indentations or recesses 118. An accessory device or mounting hardware (not shown) for use with the threaded interface assembly 110 has a contacting portion with complementary protrusions such that when the accessory device or hardware is mounted to the threaded interface assembly 110, the complementary protrusions fit into and interlock with the indentations 118, e.g., to thereby prevent undesired rotation of the attached accessory device or hardware. It will be recognized that other numbers of recesses 118 and/or other shapes of the recesses 118 are contemplated for providing an interlocking or keyed fit between the accessory/accessory mounting hardware and the threaded interface assembly 110.

In alternative embodiments, the threaded interface assembly 110 may have protrusions which are keyed to fit into complementary recesses on the accessory device or its associated mounting hardware although this is less preferred in that protruding features that stand proud of the surface 114 would tend to increase profile thickness of the unit 110 and would be likely to increase the potential for snagging when the threaded interface 110 assembly is not in use.

Figure 5:
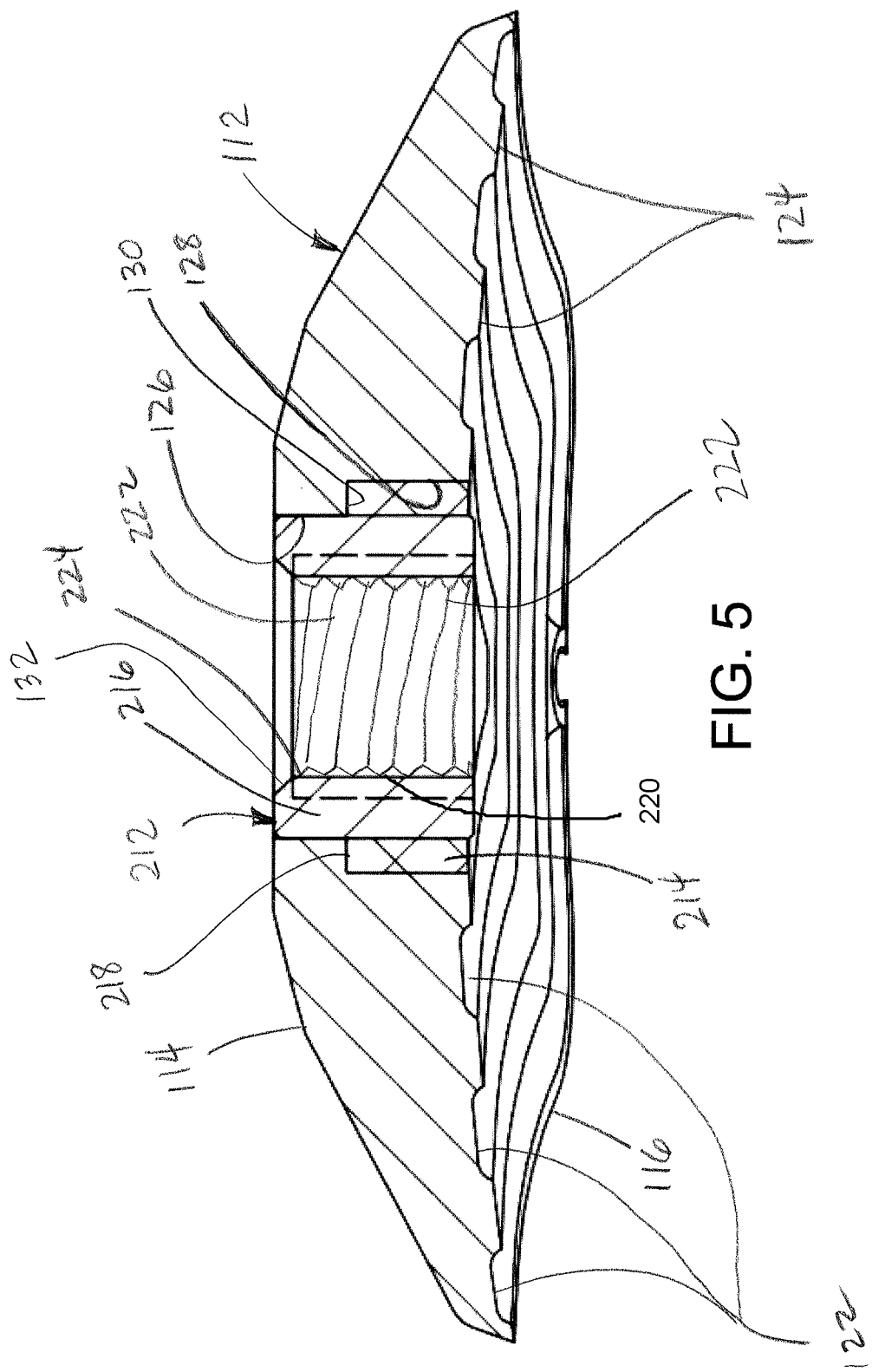
FIG. 5 is a side cross-sectional view taken along the lines 5-5 appearing in FIG. 3.

As best seen in FIGS. 4 and 5, the bottom or helmet-facing surface 116 of the illustrated threaded interface assembly 110 is generally convex and has a series channels or grooves 122 alternating with a series of lands 124 thereby defining an irregular surface for improving the bond between the threaded interface assembly 110 and the helmet 100. It will be recognized that other patterns defining an irregular or convoluted surface may be employed to providing increased bonding surface area and/or bond strength.

As best seen in FIG. 5, the threaded insert 212 is received within a cavity in the outer portion 112 extending between the outer surface 114 and the inward surface 116. In certain embodiments, the outer portion 112 is formed of a first metal, polymer material, or a fiber reinforced polymer composite material. In certain embodiments, the first metal is aluminum, preferably hard coat anodized aluminum. In certain embodiments, the polymer materials are thermoset or thermoplastic polymer materials used in advanced polymer composite systems. In certain embodiments, the fiber reinforced polymer composite material comprises a polymer matrix material selected from thermoset or thermoplastic polymer materials used in advanced polymer composite systems and reinforcing fibers formed of high strength fibers used in advanced polymer composite systems, including but not limited to carbon fiber, graphite, carbon nanotubes, glass fibers, aramid fibers, and so forth. In certain embodiments, the fiber reinforced polymer composite material comprises a polymer matrix material selected from thermoset or thermoplastic polymer materials used in advanced polymer composite systems, including but not limited to polyamides and polycarbonates, and reinforcing fibers formed of high strength fibers used in advanced polymer composite systems, including but not limited to carbon fiber, graphite, carbon nanotubes, glass fibers, aramid fibers, and so forth. In certain embodiments, the threaded interface assembly 110 is plated or otherwise coated with a plating material which matches the color of the helmet.

In certain embodiments, the threaded insert 212 is formed of a second metal which is harder than the first metal. In certain embodiments, the threaded insert is formed of stainless steel. In certain embodiments, the outer portion 112 and threaded insert 212 are formed of materials which will allow the outer portion 112 to cold flow into a feature of the threaded insert 212 upon the application of a clamping or pressing force urging the threaded insert 212 into the outer portion 112 without substantially deforming the threaded insert 212.

In the illustrated embodiment, the outer portion 112 includes a central bore 126 extending therethrough and a counterbore 128 defining a shoulder 130. The threaded insert 212 includes a threaded sleeve 216 having a threaded bore 220 with internal helical threads 222, the threaded sleeve 216 extending from an enlarged diameter base 214. The sleeve 216 is received within the bore 126 and the enlarged diameter base is received in the counterbore 128. The enlarged diameter base defines a shoulder 218 which abuts the shoulder 130. In the illustrated embodiment, the enlarged diameter base 214 resists axial pulling forces on the threaded insert 212. The threaded bore 220 has an opening 224 which is generally aligned with an opening 132 of the outer surface 114.

In certain embodiments, the sleeve 216 and/or enlarged diameter base 214 includes features such as splines, flutes, serrations, or the like, for resisting torque on the threaded insert 212 when threaded fasteners are secured to or removed from the threaded opening 224. The tapped threaded bore 220 is configured to receive a complimentary threaded fastener for securing an accessory device or mounting hardware such as a mounting bracket, shroud, or other apparatus for securing an accessory device to the helmet.

In certain embodiments, the threaded insert may be of the type having a back tapered shank for resisting axial pushing forces on the threaded insert. Exemplary threaded inserts of this type are PEM® fasteners available from Penn Engineering & Manufacturing Corp. of Danboro, Pa., or other similar self-clinching fasteners available from other manufacturers.

It will be recognized that other configurations are possible and other methods of securing the threaded insert 212 within the outer portion 112 are contemplated. In certain embodiments, the threaded insert 212 is secured within the outer portion 112 with an adhesive. In certain embodiments, the outer portion 112 is co molded or overmolded over the threaded insert 212.

The device to be attached to the threaded interface assembly 110 may be, e.g., an accessory device, or, a mounting apparatus, bracket, shroud, etc., for an accessory device. In certain embodiments, the accessory device is coupled to the threaded interface assembly 110 via mechanical fastener such as a complementarily-shaped concave interface member with a male threaded fastener that complementary with the threaded opening 224 and that is rotatably captured. In certain embodiments, the accessory device to be attached to the threaded interface assembly 110 is a pivoting helmet mount assembly (not shown).

When the threaded interface assembly 110 is not in use, i.e., no accessory device or accessory mounting hardware is attached, a cover insert 150 may be provided to removably engage with the base portion 110. In certain embodiments, the cover 150 includes a threaded member 152 which is removably received within the opening 224 to prevent debris or contamination from entering the opening 224 and/or to prevent snags when the helmet is worn in areas with brush or other snag hazards. In certain embodiments, the cover insert 150 is a threaded insert removably threaded into the threaded opening 224. In certain alternative embodiments, the cover 150 is attached to the threaded interface assembly 110 e.g., via a snap fit, press fit, or friction fit engagement. In certain embodiments, a notch is provided in the cover to facilitate removal of the cover with a tool, such as a screwdriver or other flat-edged pry tool, or the like. The outer surface 154 of the cover 150 is preferably smooth and rounded to prevent snags when the helmet is worn in areas with brush or other snag hazards.

Figure 6:
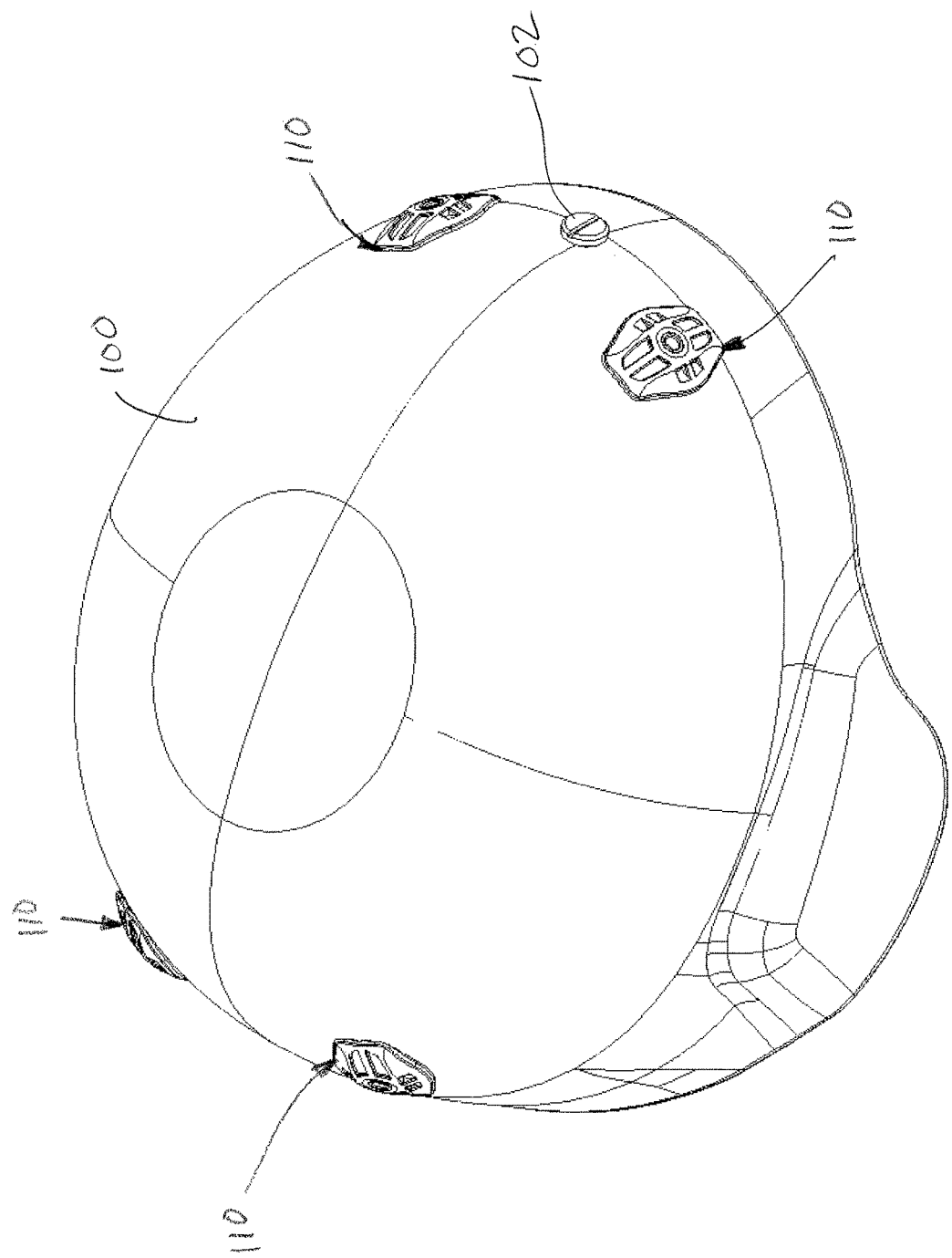
FIG. 6 is an isometric view of a helmet mounting system according to an exemplary embodiment, having four threaded interface assemblies, with two threaded interface assemblies on the front of the helmet and two threaded interface assemblies on the rear of the helmet.

FIG. 6 shows a second helmet configuration wherein a helmet 100 includes four threaded interface assembles 110 adhesively attached to the helmet 100. In the configuration appearing in FIG. 6, there are two threaded interface assemblies 110 disposed on the front portion of the helmet 100 and two threaded interface assemblies 110 disposed on the rear portion of the helmet 100. The two threaded interface assemblies 110 are spaced apart and are on opposite sides of the median plane of the helmet 100. Likewise, the two threaded interface assemblies 110 are spaced apart and are on opposite sides of the median plane of the helmet 100. In certain embodiments, the configuration appearing in FIG. 6 is adapted for attaching a forward shroud (e.g., for attaching a mounting system for a night vision device) and a rear battery compartment dock.

Although an advantage of the present invention is that it avoids the need to drill holes in the helmet shell, it will be recognized that the present invention may also be employed with existing helmets which may have one or more pre-drilled holes. In such instances, such pre-drilled holes should have a ballistic grade screw 102 screwed into the existing screw hole, as shown in FIG. 6.

In certain embodiments, the dimensions of the threaded interface assembly 110 and threaded opening 224 therein (e.g., diameter and pitch) as described herein, as well as spacing/orientation therebetween when multiple threaded interface assemblies are employed (e.g., to support a single device or piece of hardware), may be standardized to define a common interface standard that multiple manufactures can design to and to allow interchangeability of devices and mounting hardware that conform to the standard.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims and equivalents thereof.

What is claimed is:

1. A helmet mount assembly for attaching a device to an outer surface of a helmet, the helmet mount assembly comprising:
   a body defining an exterior facing side and an interior facing side opposite the exterior facing side, the body further defining a through aperture extending between a first opening on the exterior facing side and a second opening on the interior facing side;
   a modular insert positioned within the through aperture of the body such that the modular insert is positioned between the first and second openings of the body, the modular insert having a through opening coaxial with the through aperture of the body; and
   a cover removably closing the through opening of the modular insert wherein the cover has a fastener element configured to removably connect to the through opening in a snap fit manner;
   the interior facing side defining a surface pattern comprising a plurality of alternating lands and grooves, wherein the interior facing side is configured to receive an adhesive layer for coupling the interior facing side to the outer surface of the helmet, wherein the helmet mount assembly is attachable to the helmet without any fastener penetrating into the outer surface of the helmet.

2. The helmet mount assembly of claim 1, wherein the interior facing side is generally concave.

3. The helmet mount assembly of claim 1, wherein the modular insert comprises a threaded sleeve portion and an enlarged diameter portion, and further wherein the through aperture includes a bore receiving the threaded sleeve portion and a counterbore receiving the enlarged diameter portion.

4. The helmet mount assembly of claim 1, wherein the exterior facing side has a plurality of surface features radially disposed around the through aperture, the plurality of surface features configured to receive one or more complementary surface features on an attached device.

5. The helmet mount assembly of claim 1, wherein the body is formed of a material selected from the group consisting of a metal, a polymer material, and a composite material.

6. A ballistic helmet comprising:
   a ballistic shell having an outer surface; and
   a helmet mount assembly adhesively attached to the outer surface, the helmet mount assembly configured to removably attach a device;
   the helmet mount assembly comprising:
   a body defining an exterior facing side and an interior facing side opposite the exterior facing side, the body further defining a through aperture extending between a first opening on the exterior facing side and a second opening on the interior facing side;
   a modular insert positioned within the through aperture of the body such that the modular insert is positioned between the first and second openings of the body, the modular insert having a through opening coaxial with the through aperture of the body; and
   a cover removably closing the through opening of the modular insert wherein the cover has a fastener element configured to removably connect to the through opening in a snap fit manner;
   the interior facing side defining a surface pattern comprising a plurality of alternating lands and grooves, wherein the interior facing side is configured to receive an adhesive layer for coupling the interior facing side to the outer surface of the ballistic shell, wherein the helmet mount assembly is attachable to the ballistic shell without any fastener penetrating into the outer surface of the ballistic shell.

7. The ballistic helmet of claim 6, wherein the interior facing side is generally concave.

8. The ballistic helmet of claim 6, wherein the modular insert comprises a threaded sleeve portion and an enlarged diameter portion, and further wherein the through aperture includes a bore receiving the threaded sleeve portion and a counterbore receiving the enlarged diameter portion.

9. The ballistic helmet of claim 6, wherein the exterior facing side has a plurality of surface features radially disposed around the through aperture, the plurality of surface features configured to receive one or more complementary surface features on an attached device.

10. The ballistic helmet of claim 6, wherein the body is formed of a material selected from the group consisting of a metal, a polymer material, and a composite material.

* * * * *